United States Patent
Pyron

(10) Patent No.: US 6,555,749 B1
(45) Date of Patent: Apr. 29, 2003

(54) LIQUID TIGHT CONDUIT FITTING

(75) Inventor: Roger D. Pyron, Bartlett, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/616,238

(22) Filed: Jul. 14, 2000

Related U.S. Application Data

(60) Provisional application No. 60/144,317, filed on Jul. 16, 1999.

(51) Int. Cl.⁷ .................................................. H02G 3/18
(52) U.S. Cl. ................ 174/65 R; 174/65 G; 16/2.1; 439/604
(58) Field of Search ................. 174/65 R, 65 SS, 174/64, 65 G, 152 G, 153 G, 151, 135; 16/2.1, 2.2; 439/604, 587, 274, 275

(56) References Cited

U.S. PATENT DOCUMENTS

| | | | | |
|---|---|---|---|---|
| 1,006,671 A | * | 10/1911 | Myer | 285/247 |
| 2,973,212 A | * | 2/1961 | Rose | 174/51 X |
| 3,408,099 A | * | 10/1968 | Appleton | 285/247 |
| 3,902,745 A | * | 9/1975 | Mooney et al. | 285/247 |
| 4,194,768 A | * | 3/1980 | Gretz | 285/151.1 |
| 4,225,162 A | * | 9/1980 | Dola | 285/139.1 |
| 4,288,655 A | * | 9/1981 | Lass | 174/65 R |
| 4,293,151 A | * | 10/1981 | Manzel | 174/65 R X |
| 5,121,930 A | * | 6/1992 | Russell et al. | 277/582 |
| 6,034,326 A | * | 3/2000 | Jorgensen | 174/65 R |
| 6,100,470 A | * | 8/2000 | Gretz | 174/59 |
| 6,114,630 A | * | 9/2000 | Gretz | 174/65 R |
| 6,143,983 A | * | 11/2000 | Burton et al. | 174/65 R |
| 6,300,569 B1 | * | 10/2001 | Mullen, Jr. | 174/65 R |

* cited by examiner

*Primary Examiner*—Dean A. Reichard
*Assistant Examiner*—Dhiru R Patel
(74) *Attorney, Agent, or Firm*—Hoffmann & Baron, LLP

(57) ABSTRACT

A liquid tight conduit fitting for terminating flexible conduit to electrical enclosures. The fitting includes a sealing rib having a pitch of 0° located on the outer surface of the gland end and extending thereabout whereby a seal is provided between the outer surface of the gland end and the interior of a length of conduit secured thereto. The fitting further includes a protective hood secured to the gland end of the fitting whereby an annular cavity is defined about the gland end of the fitting, the annular cavity being sized to receive and enclose the terminating end of the conduit secured to the fitting.

8 Claims, 8 Drawing Sheets

TWO PIECE SNAP FIT DESIGN AIDES MOLDING AND ASSEMBLY EFFICIENCY

SNAP FIT COMPONENT PERIMETER IS HEXAGON SHAPE FOR NON SPINNING WHEN TORQUE IS APPLIED TO HEX AT INSTALLATION

TWO PIECE SNAP FIT DESIGN AIDES MOLDING AND ASSEMBLY EFFICIENCY

SNAP FIT COMPONENT PERIMETER IS HEXAGON SHAPE FOR NON SPINNING WHEN TORQUE IS APPLIED TO HEX AT INSTALLATION

LIQUID TIGHT CONDUIT FITTING

This application claims the benefit of U.S. Provisional Application No. 60/144,317 filed Jul. 16, 1999.

BACKGROUND OF THE INVENTION

The present invention relates to liquid tight conduit fittings and, more particularly, to liquid tight conduit fittings used to terminate flexible conduit to electrical enclosures.

Liquid tight conduit fittings are commonly used to terminate an end extent of a length of flexible conduit to an electrical enclosure such as a junction box. It will be appreciated that such conduit fittings, which are often formed from a plastic material such as UV resistant PVC, may be used in both exterior and interior applications. The fittings must be able to withstand certain environmental and/or physical conditions without failure.

One such category of fittings is used to provide a liquid tight connection between a section of type B liquid tight conduit and an electrical enclosure. Usage applications include exterior air conditioning wiring, swimming pool pumps, hot tubs, compressors, outdoor lighting, heat pumps or any other application requiring electrical service of 600 VAC or less and which is not subject to high levels of physical abuse. It will be appreciated that such fittings may also be used in machine tool environments.

Prior art conduit fittings include a gland end having a helical rib formed about the outer surface thereof. This gland end is inserted into an end extent of flexible conduit via a twisting process. A bushing and/or sleeve is positioned proximate the terminating end of the conduit to assist in preventing ingress of moisture into the interior of the conduit. Moreover, the terminating end of the conduit, which has often been cut by the installer and may include uneven and/or unsightly edges, remains visible after connection to the prior art fitting. This visibility of the terminating end of the conduit may provide the fitting/conduit assembly with an aestheticly displeasing appearance. Finally, the threaded enclosure-connecting end of the fitting which couples to the electrical enclosure must be attached in a watertight manner. Prior art fittings employ a conventional O-ring seal located between the fitting and the electrical enclosure. The use of conventional O-ring seals, however, may provide insufficient sealing in certain environments and/or under certain conditions.

There is therefore a need in the art for a liquid tight conduit fitting which provides improved sealing between the gland end and the end extent of the conduit without the necessity of relying on a bushing and/or sleeve. There is a further need in the art for a liquid tight conduit fitting wherein the terminating end of the length of conduit is enclosed by the fitting to provide both increased sealing and improved aesthetics. Finally, there is a need in the prior art for a liquid tight conduit fitting wherein an improved seal is provided between the threaded enclosure-connecting end and the electrical enclosure upon securement therebetween.

SUMMARY OF THE INVENTION

The present invention, which addresses the needs of the prior art, relates to a fitting for coupling an end extent of flexible conduit to an electrical enclosure. The fitting includes a body having an enclosure-connecting end and a gland end. The enclosure-connecting end is sized and configured for securement to the electrical enclosure. The gland end includes a generally cylindrical outer surface sized for insertion within the end extent of the conduit. The gland end further includes a helical rib located on the outer surface and extending thereabout to facilitate insertion of the gland end within the end extent of the conduit. Finally, the gland end includes a sealing rib having a pitch of 0° located on the outer surface thereof and extending thereabout whereby a seal is provided between the outer surface of the gland end and the interior of the conduit.

The present invention also relates to an assembly of a body and a hood. The body includes a threaded enclosure-connecting end, a gland end and a circumferentially surrounding hub having a first interfitting structure. The hood includes a substantially tubular body having first and second ends. The first end includes an aperture having a second interfitting structure formed thereabout. The aperture is sized to allow the gland end of the fitting to extend therethrough whereby the first and second interfitting structures are assembled thereby securing the hood to the body. The second end of the hood defines an annular cavity about the gland end upon assembly to the body.

The present invention further relates to an assembly of a seal and a fitting for coupling an end extent of flexible conduit to an electrical enclosure. The fitting includes a body having an enclosure-connecting end and a gland end. The enclosure-connecting end is sized and configured for securement to the electrical enclosure. The gland end includes a generally cylindrical outer surface sized for insertion within the end extent of the conduit. The gland end further includes a helical rib located on the outer surface and extending thereabout to facilitate insertion of the gland end within the end extent of the conduit. The seal is positioned about the threaded enclosure-connecting end to provide a seal between the enclosure-connecting end and the electrical enclosure. The seal defines a cloverleaf-shaped cross section which provides plural sealing points for improved sealing between the fitting and the electrical enclosure.

As a result, the present invention provides a liquid tight conduit fitting which provides improved sealing between the gland end of the end extent of the conduit without the necessity of relying on a bushing and/or sleeve. The present invention also provides a liquid tight conduit fitting wherein the terminating end of the length of conduit is enclosed by the fitting to provide both increased sealing and improved aesthetics. Finally, the present invention provides a liquid tight conduit fitting wherein an improved seal is provided between the threaded enclosure-connecting end and the electrical enclosure upon securement therebetween.

DETAILED DESCRIPTION OF THE INVENTION

Figure 2:
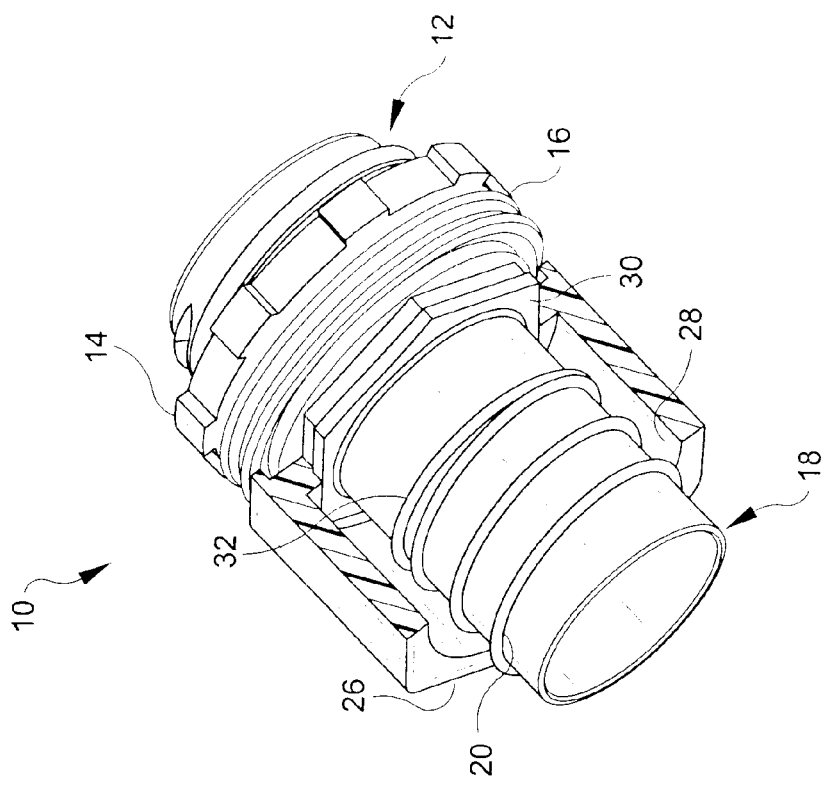
FIG. 2 is another view, in partial section, of the fitting of FIG. 1.
Figure 1:
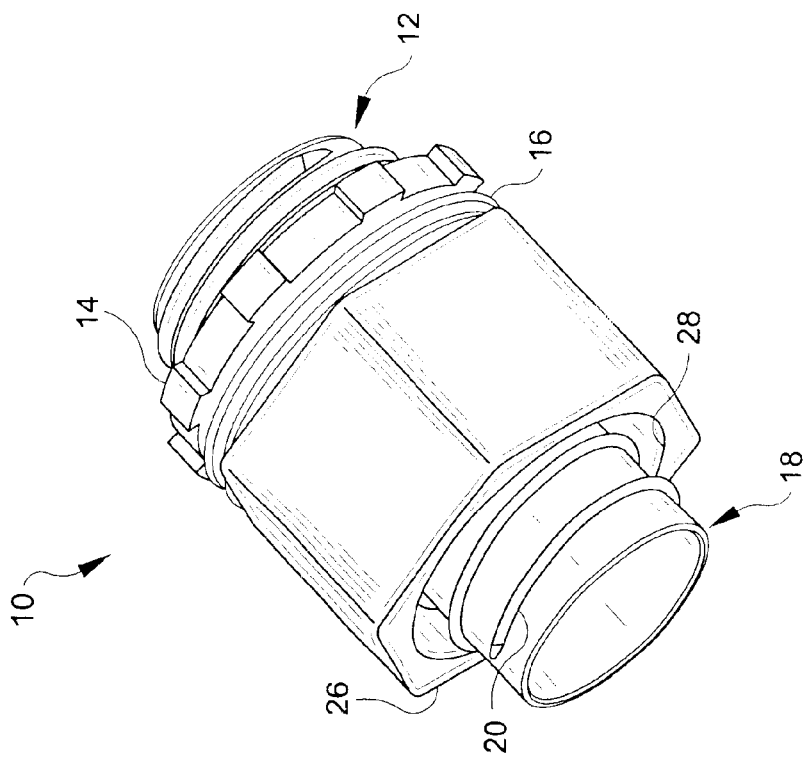
FIG. 1 is a perspective view of the fitting of the present invention.

Referring now to the drawings, a liquid tight conduit fitting 10 in accordance with the present invention is shown in FIGS. 1–4. Fitting 10 includes a threaded enclosure-connecting end 12 having an outer diameter sized to be inserted through an opening in an electrical enclosure, such as a junction box 13. A locknut 14 is then installed from the interior of the junction box to secure the fitting thereto. A seal 16, to be discussed in further detail hereinbelow, is positioned about the outer diameter of enclosure-connecting end 12 and between the fitting and the junction box to provide a liquid tight connection therebetween.

Fitting 10 further includes a gland end 18 having a helical rib 20 located on the outer surface thereof and extending thereabout. The outer diameter of gland end 18 is sized for insertion within an end extent 22 of a section of conduit 24. Fitting 10 further includes a protective hood 26 which surrounds a portion of gland end 18 thereby defining an annular cavity 28 which receives and encloses the terminating end of the conduit.

It will be appreciated that the assembly of the fitting to the conduit is accomplished by threading gland end 18 into end extent 22 of conduit 24 (which may be accomplished by hand without tools) until the terminating end of conduit 24 comes to rest against a hub 30 discussed further hereinbelow. Hub 30 thus functions in part as a conduit stop. At this point, the fitting/conduit assembly is connected to the electrical enclosure by inserting threaded enclosure-connecting end 12 through an aperture in junction box 13, and thereafter installing locknut 14 from the interior of junction box 13 to secure the fitting/conduit assembly thereto.

It has been discovered that improved sealing may be accomplished between the end extent of conduit 24 and gland end 18 via the use of protective hood 26. The annular cavity provided by hood 26 encloses and thereby protects the terminating end of the conduit from ingress of moisture. Moreover, the annular cavity provided by hood 26 covers the terminating end of the conduit which may be unsightly due to having been cut, whereby the overall aesthetics and appearance of the fitting/conduit assembly is enhanced.

Figure 5:
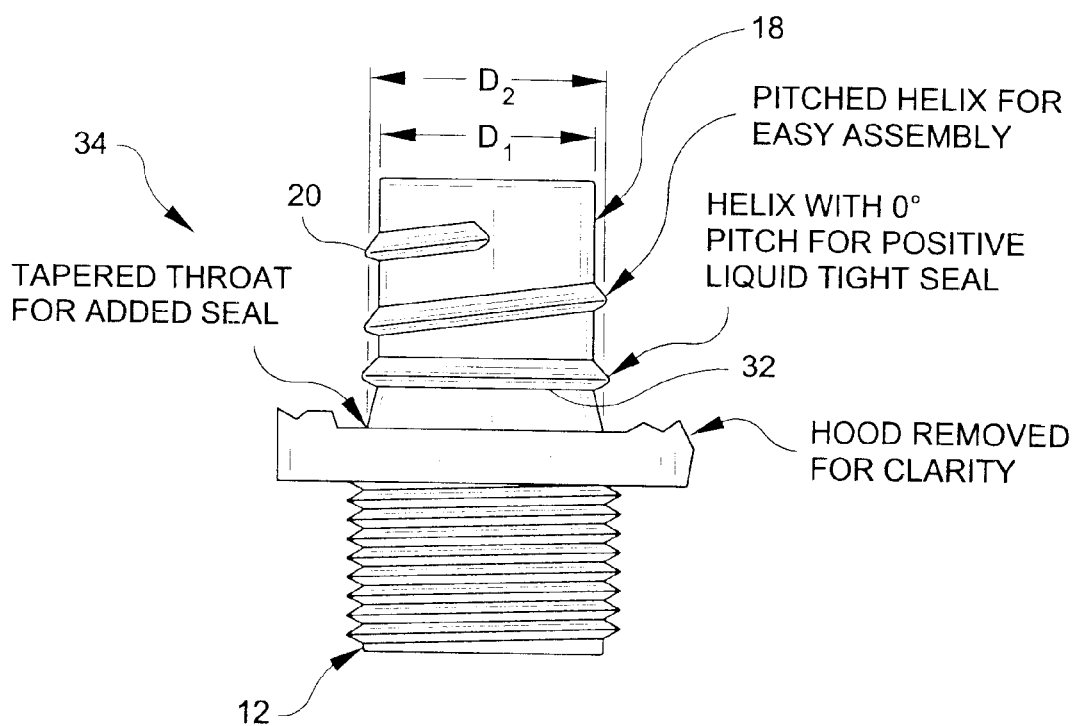
FIG. 5 is a detail of the body of the fitting of FIG. 1.

Fitting 10 is further provided with a sealing rib 32 (best shown in FIG. 2) having a pitch of 0° located on the outer surface of gland end 18 and encircling the entire perimeter thereof. It will be appreciated that this sealing rib forms a seal about the interior surface of the conduit once the gland end is inserted within the end extent of such conduit. As a result, the ingress and/or migration of liquid into the interior of conduit 24 is prevented, even in the absence of a bushing and/or sleeve. Referring to FIG. 5, this ingress and/or migration of liquid is further prevented by tapering the diameter of the outer surface of gland end 18 from a first diameter $D_1$ to a second diameter $D_2$ in the region proximate hub 30, wherein $D_2$ is greater than $D_1$.

Figure 4:
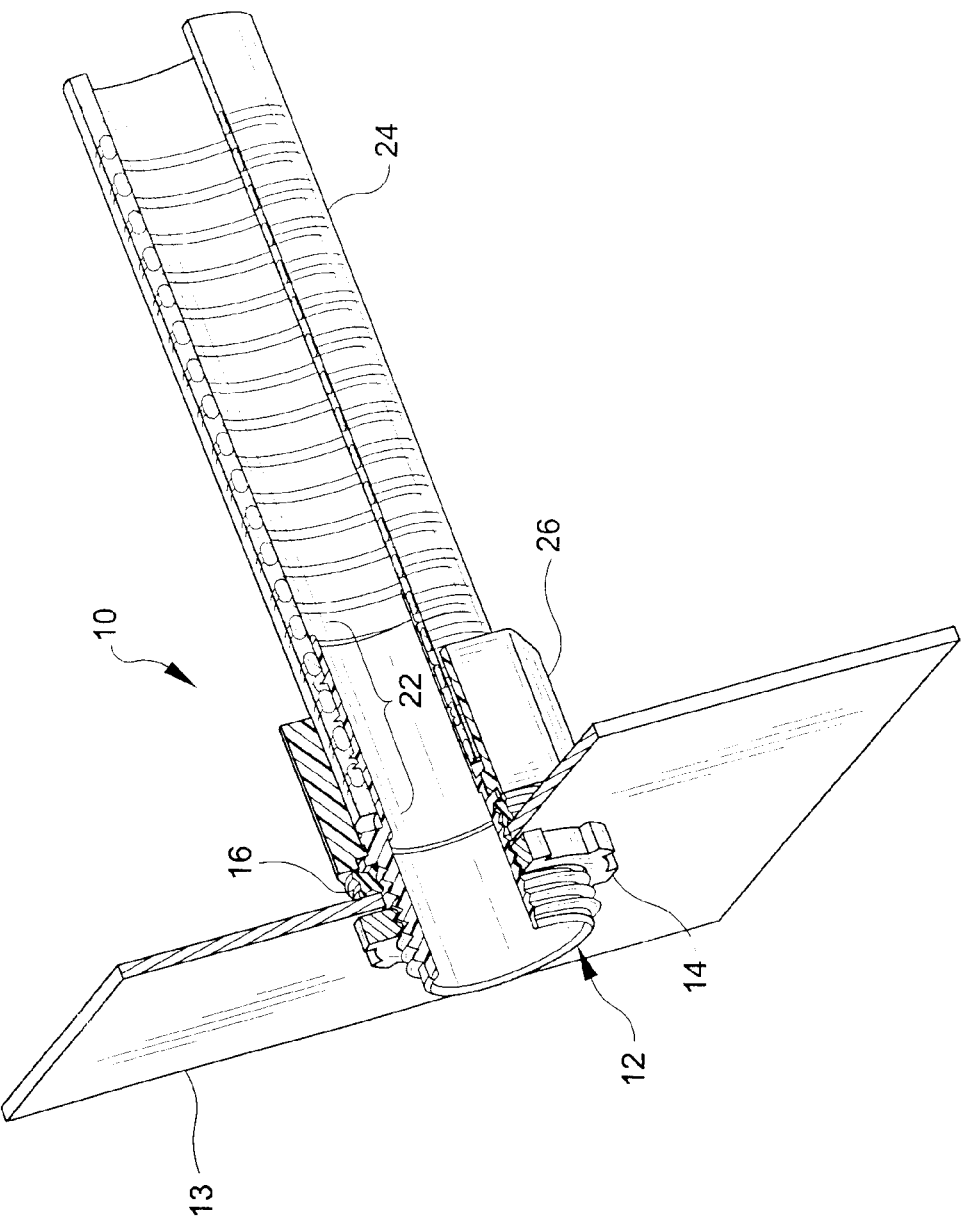
FIG. 4 is a perspective view of the fitting of FIG. 1 securing a length of conduit to a junction box.

As will be appreciated by those skilled in the art, flexible conduit is typically manufactured with a hard nylon helical core (see FIG. 4). The helical rib on gland end 18 is preferably formed with the same or substantially similar pitch as the helical core of the conduit to assist in installation of gland end 18 into the end extent of the conduit. Moreover, this design ensures a tight connection between end extent 22 and gland end 18, the design also providing resistance to pull-out of the conduit from the fitting.

Fitting 10 has been designed and developed with high manufacturing efficiency as a goal. In this regard, hood 26 is preferably formed as a separate piece, which is thereafter assembled to the body of the fitting. The design of a two-piece assembly allows automation of the molding process because there is a clean parting line for the main body component and one for the hood. Standard two-sided molds can be used to produce both the body and the hood, eliminating the need for costly multi-sided cavities which require higher cycle times and produce higher rejection rates.

Figure 3:
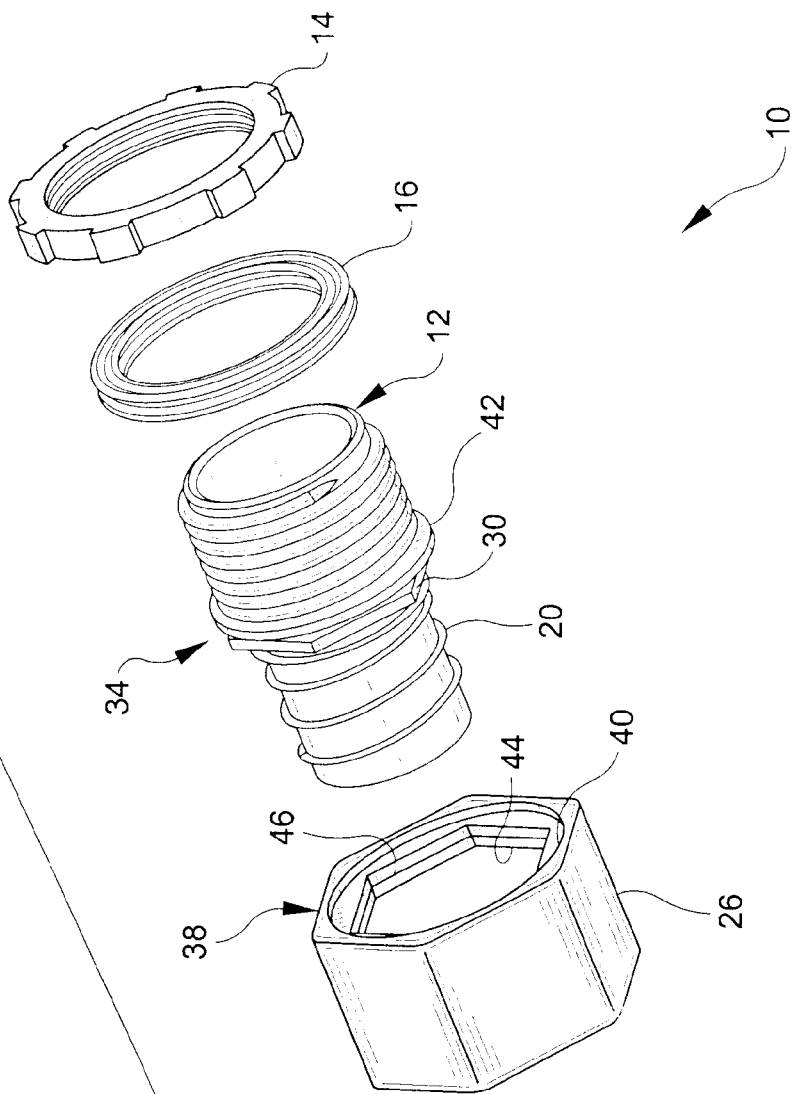
FIG. 3 is an exploded perspective view of the fitting of FIG. 1.
Figure 6:
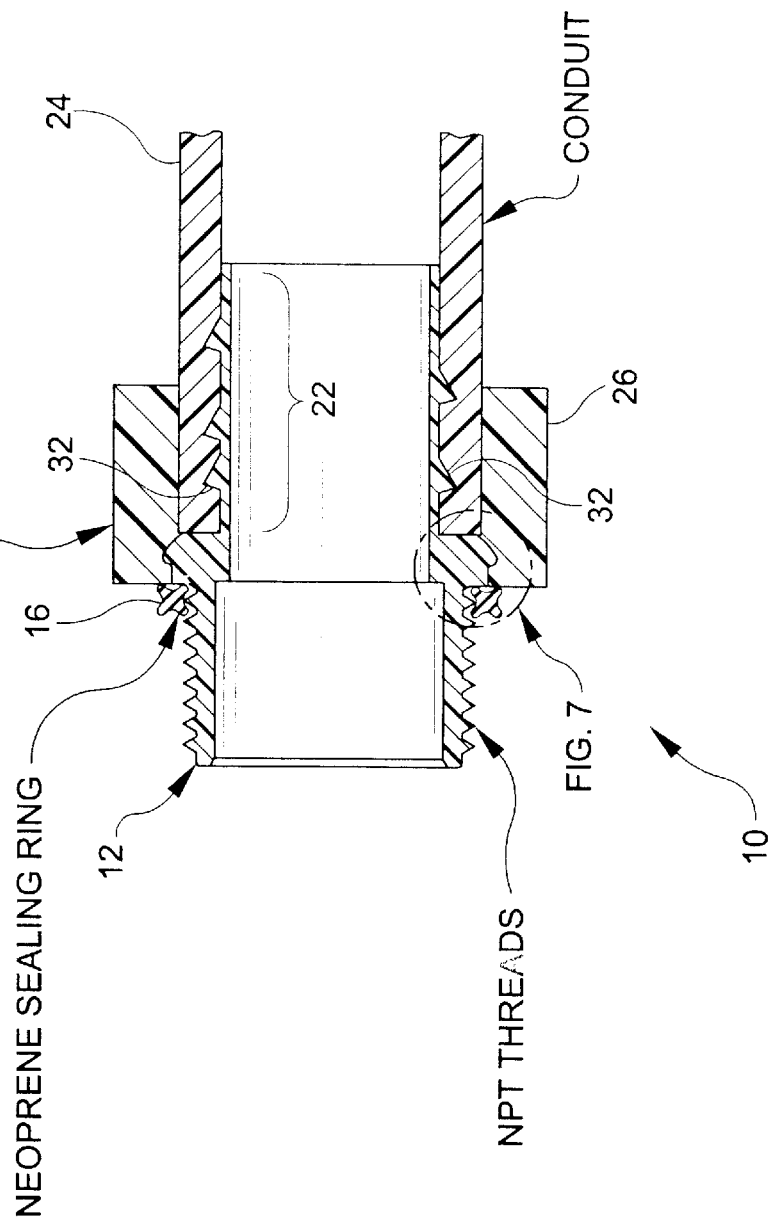
FIG. 6 is a sectional view of the fitting of FIG. 1 secured to a length of conduit.
Figure 7:
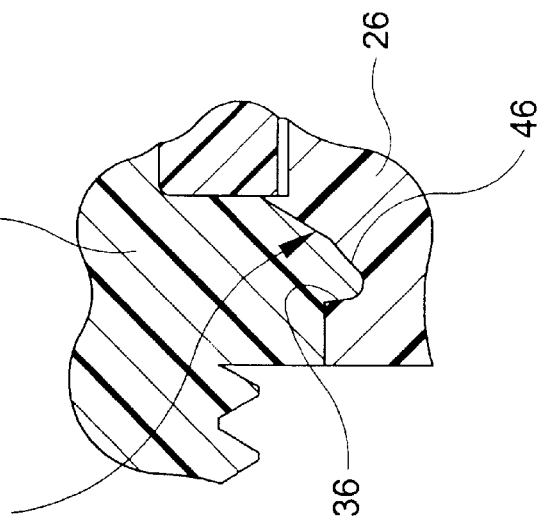
FIG. 7 is an enlarged detail taken from FIG. 6.

As shown, hub 30 circumferentially surrounds body 34 and is integrally formed therewith. This hub is provided with a first set of interfitting structure 36 (see FIGS. 6–7). Referring to FIG. 3, hood 26 includes a first end 38 having a bore 40 sized to snugly receive ring 42 formed on body 34 when the components are coupled together. First end 38 further includes a hexagonal-shaped aperture 44 which includes a second set of cooperating interfitting structure 46 whereupon assembly of hood 28 about body 34 causes engagement between cooperating interfitting structure 36, 46 thereby affixing hood 26 to body 34. It will be appreciated that the cooperating geometrical surfaces rotationally lock hood 26 to body 34. As best shown in FIGS. 2 and 6–7, interfitting structures 36, 46 utilize a snap-fit interference connection. Of course, it is contemplated that other means of securing hood 26 to body 34 may be utilized such as welding, bonding or the use of other suitable fasteners.

Figure 9:
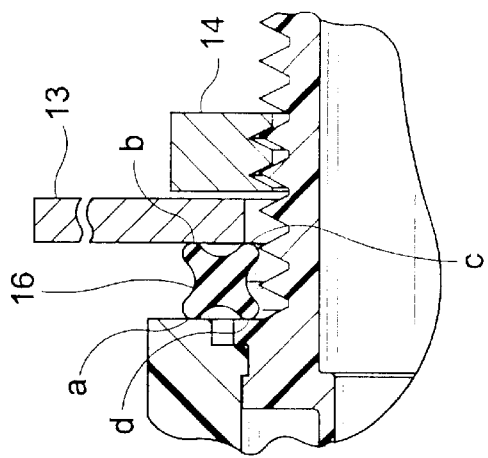
FIG. 9 is an enlarged detail taken from FIG. 8.
Figure 8:
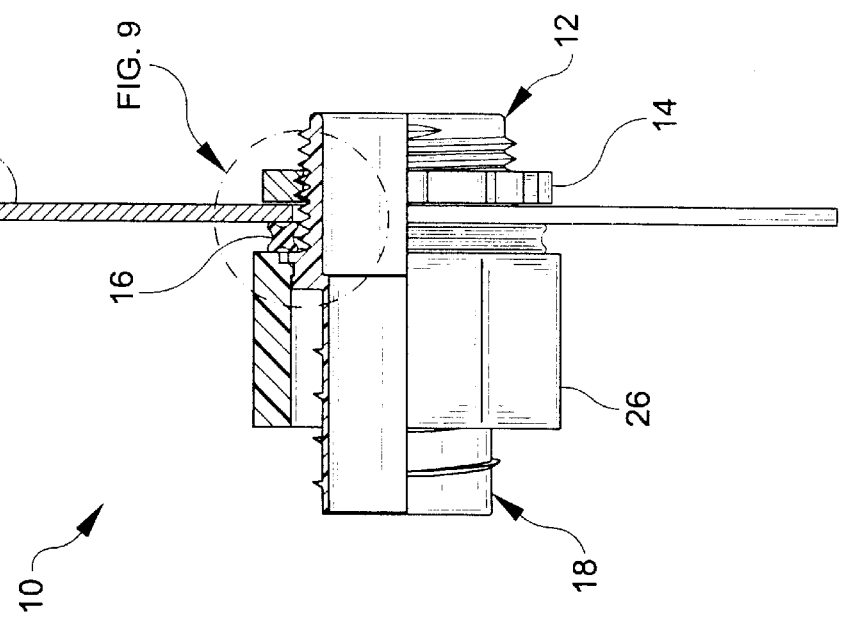
FIG. 8 is an elevational view of the fitting of FIG. 1 secured to the wall of a junction box.
Figure 10:
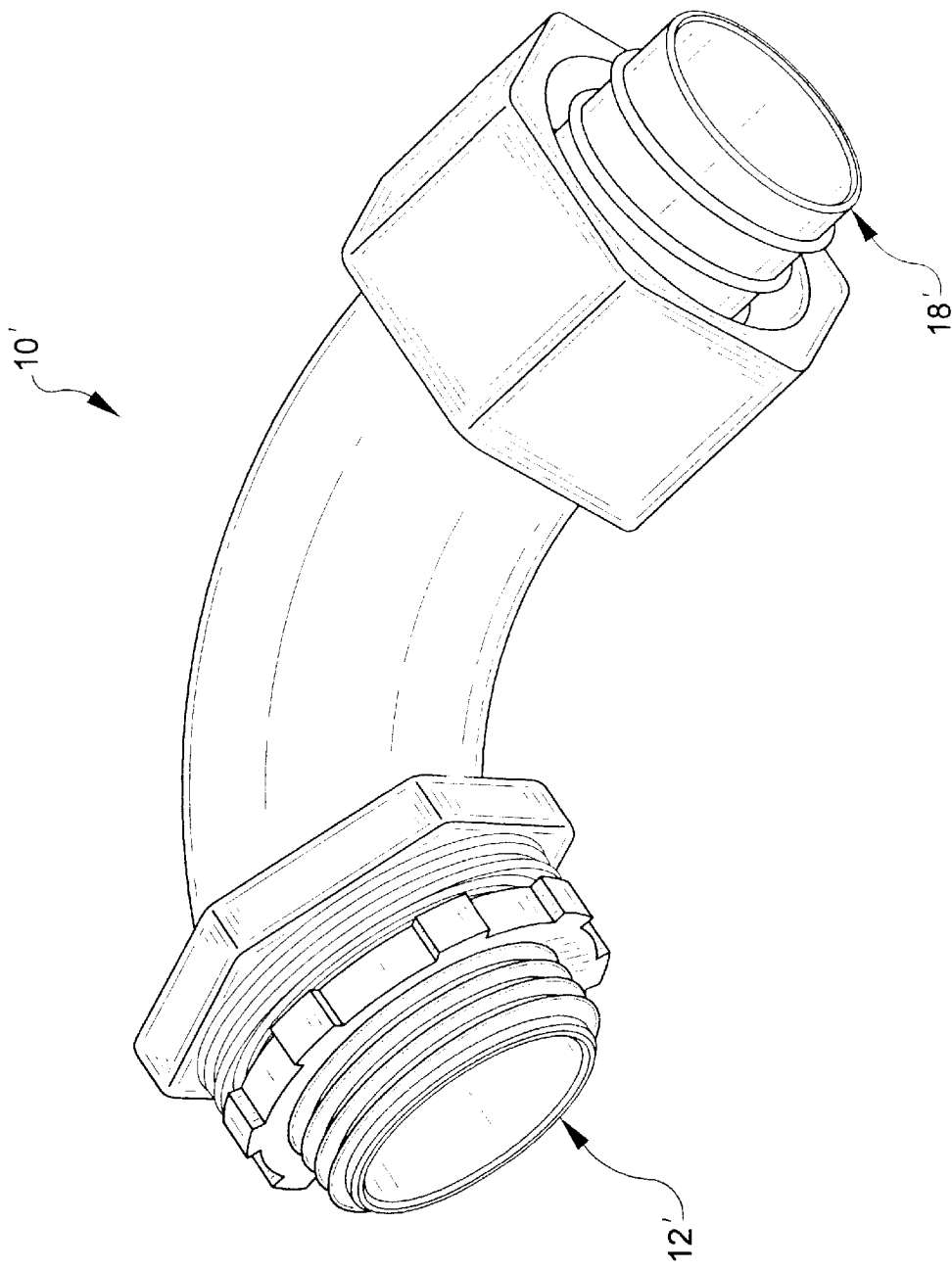
FIG. 10 is a 90° fitting similar to FIG. 1.

Referring now to FIGS. 8–9, seal 16 (which may be formed from a flexible material such as neoprene) is installed about enclosure-connecting end 12 to provide a seal between fitting 10 and the electrical enclosure. Seal 16 is preferably provided with a cloverleaf-shaped cross section (see FIG. 8) which provides plural sealing points. More particularly, the cloverleaf-shaped cross section creates plural sealing points a, b, c and d, which together resist the passing of fluid from the outside of the fitting through the aperture in the electrical enclosure.

An alternate fitting, i.e., fitting 10', is shown in FIG. 9. Fitting 10' has an enclosure-connecting end 12' oriented at 90° with respect to gland end 18', and is used in application requiring a 90° turn in the conduit run.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included within the scope of the following claims.

What is claimed is:

1. An assembly, comprising:
   a) a body, comprising:
      a threaded enclosure-connecting end, a gland end and a circumferentially surrounding hub having a first interfitting structure; and
   b) a hood, comprising:
      a substantially tubular body having first and second ends, said first end including an aperture having a second intermitting structure formed thereabout, said aperture sized to allow said gland end of said body to extend therethrough whereby said first and second interfitting structures are assembled thereby securing said hood to said body, said second end of said hood defining an annular cavity about said gland end upon assembly to said body and;
   wherein said first and second interfitting structures comprise snap-fit cooperating structures.

2. The assembly according to claim 1, wherein said body is formed with an angular configuration.

3. The assembly according to claim 1, wherein the diameter of said outer surface of said gland end tapers from a first diameter $D_1$ to a second diameter $D_2$ proximate said enclosure-connecting end, said second diameter $D_2$ being greater then said first diameter $D_1$.

4. The assembly according to claim 1, wherein said circumferentially surrounding hub and said aperture are provided with complementary geometrical surfaces to rotationally lock said hood to said body upon assembly thereto.

5. The assembly according to claim 4, wherein said circumferentially surrounding hub and said aperture are provided with complementary hexagonal-shaped geometrical surfaces.

6. The assembly according to claim 1, wherein said hood includes a hexagonal-shaped outer perimeter.

7. The assembly according to claim 1, further comprising a seal positioned about said threaded enclosure-connecting end to provide a seal between said enclosure-connecting end and said electrical enclosure, said seal defining a cloverleaf-shaped cross section which provides plural sealing points.

8. The assembly according to claim 1, wherein said gland end includes a generally cylindrical outer surface sized for insertion within an end extent of a section of conduit, said gland end further including a helical rib located on said outer surface to facilitate insertion of said gland end within said end extent, said gland end further including a sealing rib having a pitch of 0° located on said outer surface and extending thereabout whereby a seal is provided between said outer surface of said gland end and the interior of said conduit, said helical rib extending toward and terminating at said sealing rib.

* * * * *

UNITED STATES PATENT AND TRADEMARK OFFICE
CERTIFICATE OF CORRECTION

PATENT NO.     : 6,555,749 B1
DATED          : April 29, 2003
INVENTOR(S)    : Roger D. Pyron It is certified that error appears in the above-identified patent and that said Letters Patent is hereby corrected as shown below:

<u>Column 4,</u>
Line 55, "intermitting structure" should be -- interfitting structure --.

Signed and Sealed this

Fourteenth Day of October, 2003

JAMES E. ROGAN
*Director of the United States Patent and Trademark Office*